S. LONGMAN.
Separating Metallic Substances.

No. 21,204.  Patented Aug. 17, 1858.

UNITED STATES PATENT OFFICE.

SAMUEL LONGMAN, OF BROOKLYN, NEW YORK.

AMALGAMATING GOLD AND SILVER.

Specification of Letters Patent No. 21,204, dated August 17, 1858.

*To all whom it may concern:*

Be it known that I, SAMUEL LONGMAN, of the city of Brooklyn, in the county of Kings and State of New York, have invented a new and useful Improvement in the Process of Separating Metallic Substances from Foreign Matters by Amalgamation; and I do hereby declare that the following is a full, clear, and exact description of the same, reference being had to the acccompanying drawings, forming part of this specification, in which—

Figure 1:
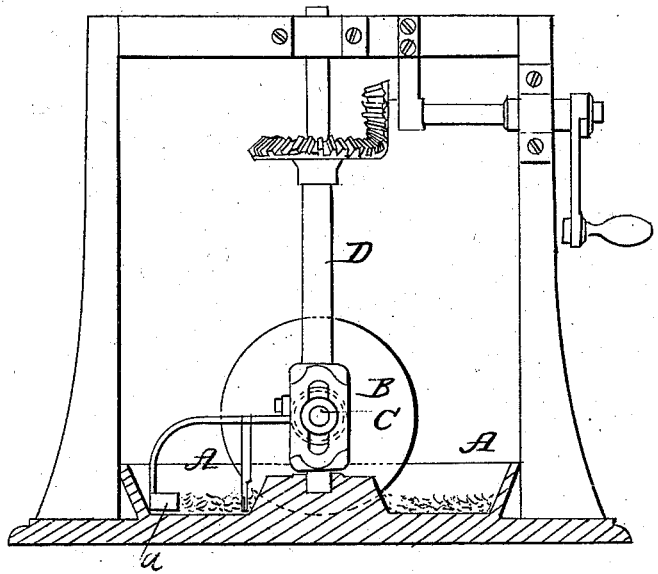
Figure 2:
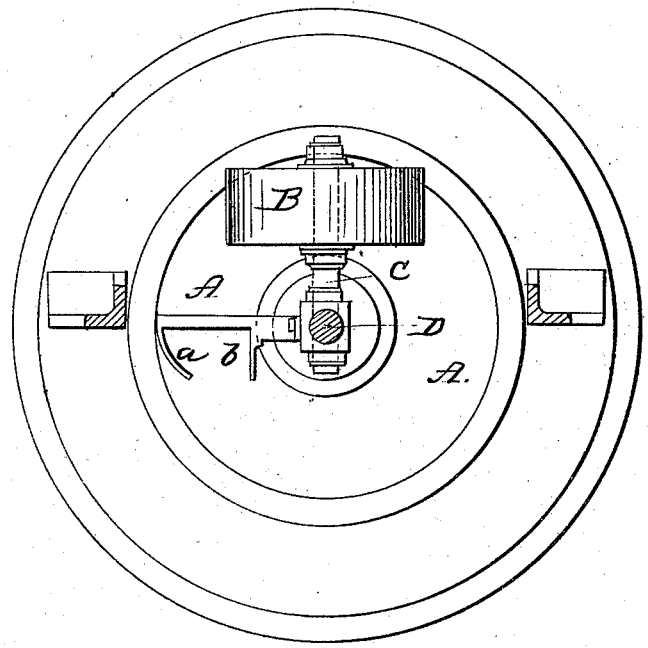

Figure 1, is an elevation partly in section of a machine employed in performing the process of amalgamation. Fig. 2 is a horizontal section of the same.

Similar letters of reference indicate corresponding parts in both figures.

To explain the nature of my improvement I will first state that the process of extracting the precious metals from the earthy or mineral matter with which they are found, by amalgamation, has generally been performed with a constant and copious stream of water running into and passing through or overflowing from the vessel in which the amalgamation is effected, the object of which is to wash away the earthy or foreign matter at once and leave the metal free to amalgamate. But by the use of water in this way there is produced a tendency of the quicksilver to subside to the bottom of the vessel separate from the matters to be operated upon, and this is more especially the case when the precious metals are in very fine particles, and consequently much of the precious metal (which is sometimes in such fine particles as will float for a time in water) are washed away with the earthy or foreign matter.

With a view to obviate the effects of using water in this way, my improvement consists in working together the whole of the matters to be treated *i. e.* the metal and all the foreign matter with which it is mixed, and the quicksilver, with only a sufficient quantity of water to enable the whole to be kneaded up to a pasty state, and kneading the whole together till a pasty mass is produced and for such time after as shall be judged sufficient to have effected an amalgamation of all the metallic particles, before employing the washing process to wash away the nonmetallic or foreign matter.

This improvement although applicable both to the working of quartz and other ore of gold and silver, and to what are called sweeps, scraps, and polishings of gold and silver manufacturers, is specially adapted to recover the waste metal of these manufacturers. I shall therefore first describe briefly the waste matters that accumulate in such manufactories and the general manner of treating the waste, a part of which process is embraced herein. If the waste be silver polishings only, then it may be put directly into the grinding apparatus hereinafter described, but where it consists of clippings of precious and base metals mixed, or mixtures made in any other way, these mixtures are treated in furnaces to oxidize the base metals and thus disengage the precious metals preparatory to the amalgamation. If the precious metals in the ore be in the metallic state and duly pulverized then they may be treaated in the same way as the manufacturers' waste after it has come from the furnace and been duly pulverized, that is, the pulverized mass is put into the receptacle of an edge-stone or other equivalent grinding mill with a certain amount of quicksilver, the proportion of which is estimated from previous and partial trial, by chemical tests, or experience. The mill is started, and at the same time the surface of the powder is dampened slightly by sprinkling over it a little water, carefully avoiding making a muddy mixture by adding too much water. The materials do not appear to mix at first. The quicksilver separates and moves by itself over the bed of the mill, and the powder partly dry and partly agglutinated from the sprinkling of the water separates in lumps and agglomerated masses. If the material be silver polishings, after an hour or an hour and a half working of the mill it agglutinates into a homogeneous mass not unlike that called blue mass, or of the consistence of putty, in which the quicksilver appears absorbed in the body of the unguent. If the material be sweepings or scraps with the baser metals burned in the furnace, and subsequently pulverized, it may require some two, three, or more hours to mix them into a homogeneous unguent. If the material be a native compond containing the precious metals in the metallic state, it is also capable of being treated in this same manner by being worked into an unguent of ore quicksilver and water. To the operator it is known when the grinding and mixing is completed by the mass assuming a homogeneous appearance and no quicksilver appearing in any considerable globules throughout the mass but appearing in fine metallic points throughout the whole.

The machine represented in the drawing is composed principally of an annular trough A, to receive the metallic substance to be treated together with the quicksilver and a water cylindrical roller or edge-runner B, which is fitted to turn on a horizontal axle C, which is attached to a vertical shaft D, which rotates in the center of the trough A, and carriers the roller around and around the trough. The shaft D, has also attached to it two scrapers or agitators $a$, $b$, which stir the contents of the trough in front of the roller while the roller by passing over the substances behind the scrapers or agitators works them together. The above operation of the roller and scrapers or agitators produce the before specified results of first working the substances up into the pasty state and afterward without the addition of more water effecting the amalgamation. The subsequent washing may be performed by the same machine if a current of water sufficient to produce a copious overflow is admitted to the trough A, while the operation of the roller and scrapers or agitators is continued, or it may be effected in any other machine of a character similar to those generally used for washing ores or metallic substances.

I am aware that in the Chilean and Brazilian mines the metalliferous matter is worked without water in some cases, and with a very small stream of water in others, making a sort of mud or pap of the water and mineral matter previous to mixing the quicksilver, but it will be perceived there is a clear line of demarcation between these modes of working and that devised by me. The former, if they use water at all, use it in quantity to make a mud or pap, and the materials are not only wet, but they are worked substantially in water, while in the latter the materials in a powder are mixed dry with the quicksilver and barely enough water added to agglutinate them into a heavy, doughy mass, like a stiff ointment. If enough water be added to render the mass muddy or thin, the process would be spoiled because the water would act to carry away the quicksilver from the solid metals; if on the other hand the water was insufficient to cause the mass to agglutinate the process would be equally worthless and unsuccessful. It is therefore neither a wet process nor a dry process that constitutes the peculiarity of my invention, but it may be characterized as the unguent process. Therefore I do not claim as my invention the machine herein described, and I do not confine myself to the use of any particular machinery or apparatus in performing my invention.

What I claim as my invention and desire to secure by Letters Patent is—

Masticating or kneading in the manner set forth the dry metalliferous powder of the gold and silver smith's sweeps, scraps, and polishings, or the native precious metals when so prepared, with quicksilver, when sprinkled with barely sufficient water to cause the mass to agglutinate.

SAMUEL LONGMAN.

Witnesses:
 MICHL. HUGHES,
 W. TUSCH.